US 6,564,328 B1

(12) United States Patent
Grochowski et al.

(10) Patent No.: US 6,564,328 B1
(45) Date of Patent: May 13, 2003

(54) MICROPROCESSOR WITH DIGITAL POWER THROTTLE

(75) Inventors: Edward T. Grochowski, San Jose, CA (US); Vinod Sharma, Sunnyvale, CA (US); Gregory S. Matthews, Santa Clara, CA (US); Vivek Joshi, Sunnyvale, CA (US); Ralph M. Kling, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/471,795

(22) Filed: Dec. 23, 1999

(51) Int. Cl.[7] ................................................. G06F 1/26
(52) U.S. Cl. ...................................................... 713/320
(58) Field of Search ................................. 713/320, 322, 713/323, 324

(56) References Cited

U.S. PATENT DOCUMENTS

| 5,392,437 | A | * | 2/1995 | Matter et al. ................ 713/324 |
| 5,495,617 | A | * | 2/1996 | Yamada ....................... 713/323 |
| 5,557,551 | A | | 9/1996 | Craft |
| 5,719,800 | A | | 2/1998 | Mittal et al. |
| 5,815,724 | A | * | 9/1998 | Mates ......................... 713/322 |
| 6,029,006 | A | * | 2/2000 | Alexander et al. ........... 713/323 |
| 6,192,479 | B1 | * | 2/2001 | Ko .............................. 713/322 |
| 6,219,796 | B1 | * | 4/2001 | Bartley ........................ 713/320 |

FOREIGN PATENT DOCUMENTS

EP           0592783 A2    4/1994

* cited by examiner

*Primary Examiner*—Glenn A. Auve
(74) *Attorney, Agent, or Firm*—Leo V. Novakoski

(57) ABSTRACT

The present invention provides a digital-based mechanism for adjusting the power consumption in an integrated digital circuit such as a processor. The processor includes one or more functional units and a digital throttle that monitors activity states of the processor's functional units to estimate the processor's power consumption. One embodiment of the digital throttle includes one or more gate units, a monitor circuit, and a throttle circuit. Each gate unit controls the delivery of power delivery to a functional unit of the processor and provides a signal that indicates the activity state of its associated functional unit. The monitor circuit determines an estimated power consumption level from the signals and compares the estimated power consumption with a threshold power level. The throttle circuit adjusts the instruction flow in the processor if the estimated power consumption level exceeds the threshold power level.

25 Claims, 6 Drawing Sheets

MICROPROCESSOR WITH DIGITAL POWER THROTTLE

BACKGROUND OF THE INVENTION

1. Technical Field

The present invention relates to microprocessors and, in particular, to mechanisms for controlling power consumption in microprocessors.

2. Background Art

Modern processors include extensive execution resources to support concurrent processing of multiple instructions. A processor typically includes one or more integer, floating point, branch, and memory execution units to implement integer, floating point, branch, and load/store instructions, respectively. In addition, integer and floating point units typically include register files to maintain data relatively close to the processor core. One drawback to providing a processor with extensive execution resources is that significant amounts of power are required to run them. Different execution units may consume more or less power, depending on their size and the functions they implement, but the net effect of packing so much logic onto a relatively small process chip is to create the potential for significant power dissipation problems.

Few programs require the full range of a processor's execution resources for significant intervals. The power dissipated running a program depends on the nature of its component instructions and their potential for being executed in parallel. Programs typically include a variety of instruction types, but it is rare that enough instructions of the correct type are available to keep all of the processor's execution resources busy for significant time periods. For this reason, most processor employ a clock gating mechanism to cut off the clock delivered to execution resources when they are not being used and hence reduce power. In addition, different components of an execution resource can be turned on and off as instructions enter and exit the pipe stage serviced by the component. Consequently, the average program may dissipate relatively manageable power levels.

Some programs do activate many of a processor's execution resources for relatively long time intervals and, consequently, dissipate significantly greater power than average programs. Unless a mechanism is provided to limit the processor's power consumption, the processor is generally designed to handle programs that consume the highest power. This may require running the processor at less than its top performance level for all programs, independent of the power required to run the average program.

Power throttling is a strategy that has been proposed to handle the power consumption problems created by high performance processors. Power throttling reduces the performance of a processor when its power consumption gets too high. This may be done by temporarily reducing the rate at which the processor executes instructions until power consumption decreases to a safe level. Power throttling allows the processor to be designed for the power levels at which the average program runs. When a resource-hungry program runs, the processor reduces its instruction execution rate to maintain its power consumption within an established limit.

Proposed power-throttling mechanisms rely on analog parameters to monitor the power being dissipated by a processor. For example, a thermal throttling mechanism monitors the temperature of the processor chip and reduces the processor's execution speed when the temperature exceeds a threshold value. Other throttling schemes have been proposed to monitor the current consumed by a processor or the duty cycle of a pulse width modulator in a switching regulator.

These power-throttling mechanisms have a number of drawbacks. They introduce additional analog circuitry into a predominantly digital environment, i.e. the processor. They are prone to vary with changes in the processor's environment (temperature, voltage, composition). They may create low frequency variations in the processor's power level. They do not directly limit the power consumed by the processor, and they are not deterministic. That is, their behavior can not be predicted on a clock by clock basis.

The present invention addresses these and other deficiencies of available power throttling mechanisms.

SUMMARY OF THE INVENTION

The present invention provides a digital throttle to control the power consumption of a microprocessor.

In accordance with the present invention, a processor includes one or more functional units and the digital throttle. The digital throttle monitors activity states of the processor's functional units to estimate the processor's power consumption.

For one embodiment of the invention, the digital throttle includes one or more gate units, a monitor circuit, and a throttle circuit. Each gate unit controls the delivery of power delivery to a functional unit of the processor and provides a signal that indicates the activity state of its associated functional unit. The monitor circuit determines an estimated power consumption level for the processor from signals and compares the estimated power consumption with a threshold power level. The throttle circuit adjusts the instruction flow in the processor if the estimated power consumption level exceeds the threshold power level.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

Figure 1:
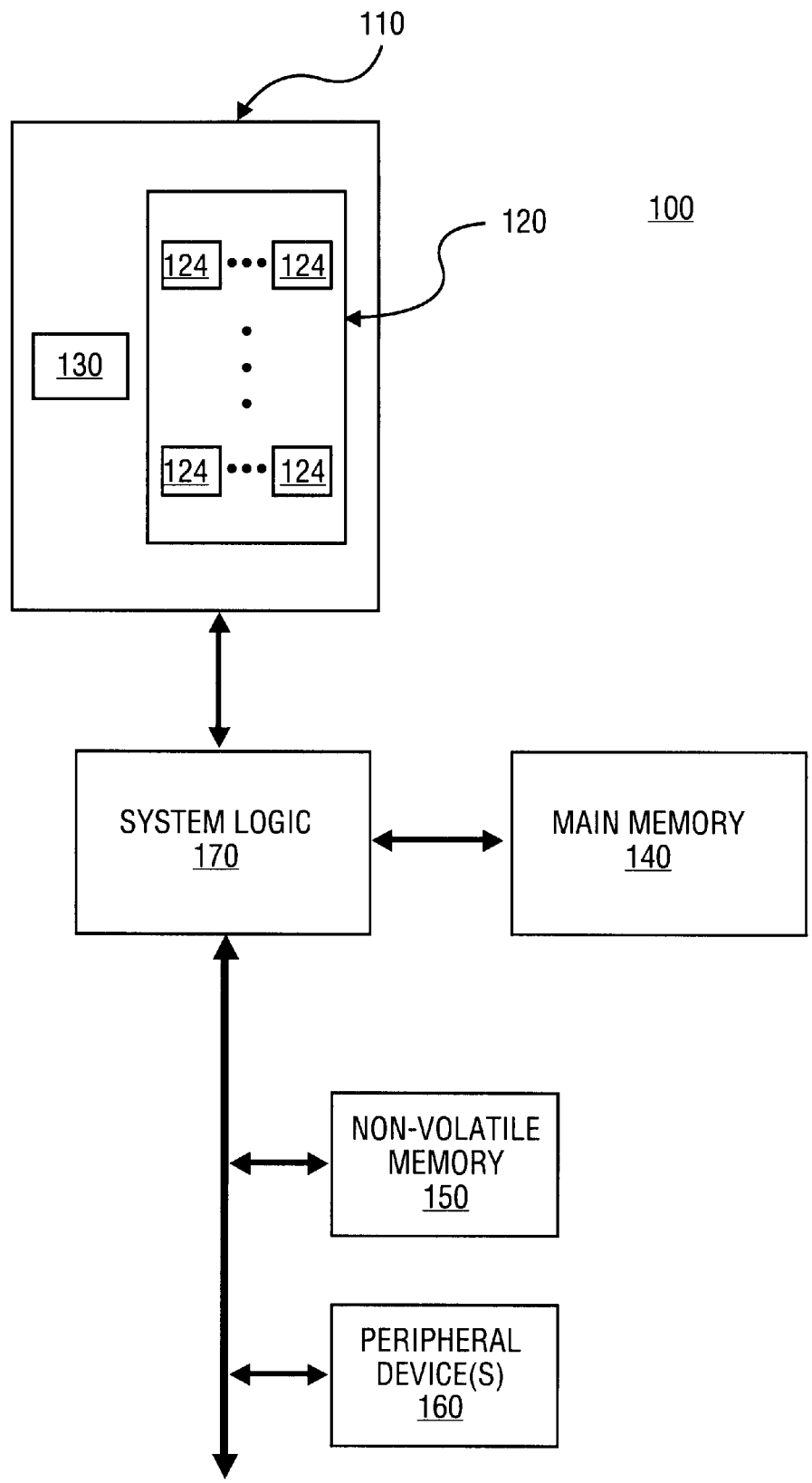
FIG. 1 is a block diagram of one embodiment of a computer system on which the present invention may be implemented.

The following discussion sets forth numerous specific details to provide a thorough understanding of the invention.

However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The present invention provides a mechanism for controlling the power dissipation of a processor by monitoring the activity of the processor's functional units in response to a sequence of instructions. The activity, e.g. which functional units are activated by the instructions currently in process, may be represented by binary signals which indicate whether corresponding functional units are on or off. An estimate of the power consumed by the processor is provided by summing a power weight associated with each functional unit that is currently "on". The power weight for a functional unit represents the amount of power the functional unit consumes when it is activated. If the estimated power exceeds a threshold level, a throttle mechanism adjusts the instruction flow through the processor to reduce the activity of the functional units.

Power weights for each functional unit may be determined through a calibration process. For example, the digital throttle may be calibrated once as a part of the design process or it may be self-calibrating. In the latter case, the digital throttle may employ current monitoring circuitry and a calibration algorithm periodically to adjust power weights for each functional unit.

For one embodiment of the invention, a gate unit is associated with each functional unit to control power delivery to the functional unit in response to the instructions currently in process. A pipeline control circuit indicates to each gate unit the on/off state of its associated functional unit. A signal from each gate unit indicates to a monitor circuit the on/off state for its associated functional unit. The monitor circuit includes or ignores the corresponding power weight in an estimate of the processor's current power consumption according to the indicated state. Alternatively, each gate unit signal may communicate to the monitor circuit the power weight of its associated functional unit when the functional unit is "on". Other embodiments of the invention may employ other mechanisms for indicating the power weights to be considered in the estimated power.

The monitor circuit sums the power weights for active functional units and compares them with a threshold value to provide clock by clock estimates of the processor's power consumption. For one embodiment of the digital throttle, these estimates are accumulated over multiple clock cycles to provide an accumulated power value that smoothes out clock by clock variations in the processor's power consumption. A throttle circuit adjusts the rate at which instructions are processed according to the accumulated power value. For example, the throttle circuit may inject "bubbles" into the processor's instruction execution pipeline to reduce performance or it may decrease the frequency at which the processor's clock operates.

The disclosed mechanism thus relies on digital events (activity states) in the processor's logic to estimate power consumption and adjusts the rate of these events directly through the rate at which instructions are processed. This provides a fast, direct, and deterministic mechanism for controlling a processor's power consumption, and it does so without introducing analog circuitry into the processor.

FIG. 1 is a block diagram of one embodiment of a computer system 100 in which the present invention may be implemented. Computer system 100 includes one or more processors 110, a main memory 140, a non-volatile memory 150, various peripheral devices 160, and system logic 170. System logic 170 controls data transfers among processor(s) 110, main memory 140, non-volatile memory 150, and peripheral devices 160. Computer system 100 is provided to illustrate various features of the present invention. The particular configuration shown is not necessary to implement the present invention.

Processor 110 includes multiple functional units 124, which form an instruction execution pipeline 120. Instructions are provided to processor 110 from main memory 140 and non-volatile memory 150. A digital throttle 130 monitors power consumption in the various functional units 124 in response to the processed instructions and adjusts the flow of instructions through pipeline 120 accordingly.

As an instruction is staged down pipeline 120, it directs various functional units 124 to perform one or more operations that, taken together, implement the instruction. For example, a floating-point multiply-accumulate instruction (FMAC) may cause the following operations to occur in the indicated resources: a floating point register file reads out three operands; an FMAC execution unit multiplies two of the operands and adds the product to the third operation; an exception unit checks the product and sum for errors; and a retirement unit writes the result to the floating point register file if no errors are detected. Depending on the particular processor implementation, these resources or their components may be grouped into one or more functional units which are turned on and off as the instruction is staged down the pipeline. Each functional unit consumes a certain amount of power as it is activated by the instruction.

For one embodiment of the present invention, the power consumed by a functional unit 124 is represented by an associated power weight. When a functional unit is activated by an instruction, digital throttle 130 detects its active state and adds its associated power weight to an estimate of the processor's total power consumption. Digital throttle 130 implements these operations over a selected interval, generates an estimate of the power consumed by the currently executing instruction sequence, and adjusts the instruction flow through pipeline 120 if the estimated power consumption exceeds a specified threshold level.

Figure 2:
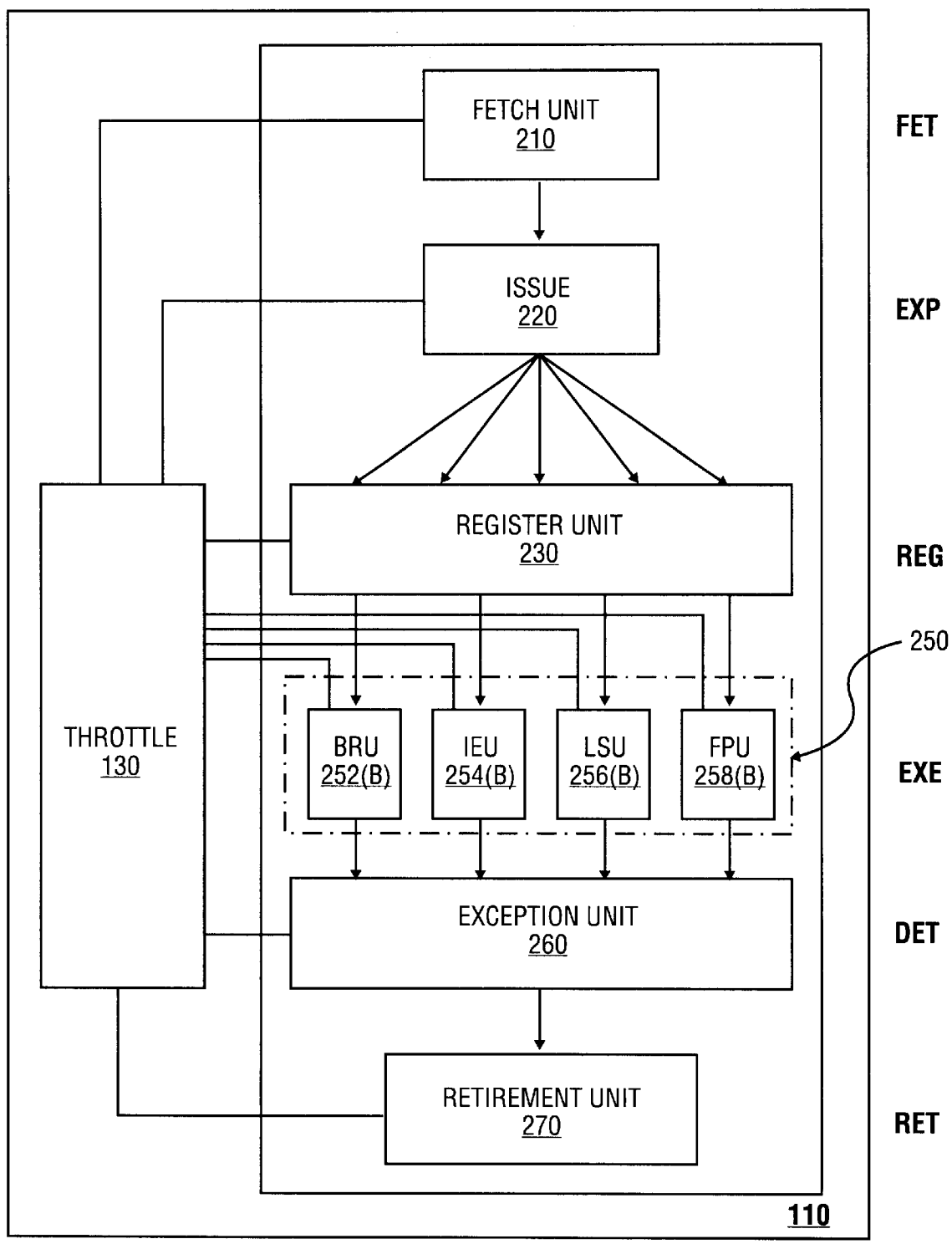
FIG. 2 is a block diagram of one embodiment of a processor that implements a digital power throttle in accordance with the present invention.

FIG. 2 represents in greater detail one embodiment of processor 110. For the disclosed embodiment of processor 110, pipeline 120 is represented as fetch (FET), expand (EXP), register (REG), execution (EXE), detect (DET), and retirement (RET) stages, respectively, and the execution resources corresponding to each stage is indicated. The present invention does not require partition of processor 110 into a particular set of pipeline stages. For example, a disclosed stage may be subdivided into two or more stages to address timing issues or facilitate higher processor clock speeds. Alternatively, two or more stages may be combined into a single stage. Other embodiments may include hardware for processing instructions out-of-order. The disclosed pipeline provides only one example of how operations may be partitioned in a processor implementing the present invention.

The front end of pipeline 120 includes fetch unit 210 and issue unit 220, which provide instructions to execution units in the back end of pipeline 120 for execution. Fetch unit 210 retrieves instructions from memory 140 directly or through a local cache (not shown) and provides the fetched instructions to issue unit 220. Issue unit 220 decodes the instructions and issues them to the execution resources in the back end of pipeline 120.

Throughout this discussion, the term "instruction" is used generally to refer to instructions, macro-instructions, instruction bundles or any of a number of other mechanisms used to encode processor operations. For example, the decode operation may transform a macro-instruction into one or more micro-operations ($\mu$ops), resolve an instruction bundle into one or more instruction syllables, or retrieve a micro-code sequence associated with an instruction.

The back end of pipeline 120 includes register unit 230, execution unit 250, exception unit 260 and retirement unit 270. Register unit 230 includes a register rename unit and various register files (not shown) to identify the registers specified in the instructions and to accesses the data from the identified registers, respectively. Execution unit 250 includes one or more branch execution units (BRU) 252, integer execution units (IEU) 254, load/store units (LSU) 256, and floating point execution units (FPU) 258 to process branch, integer, load/store, and floating point instructions. Exception unit 260 checks the results generated by execution units 250 and adjusts the control flow if an exceptional condition is encountered. If no exceptional conditions are detected, retirement unit 270 updates the architectural state of processor 110 with the results.

The functional units activated by different instructions correspond to various combinations and subsets of the execution resources indicated for pipeline 120. Digital throttle 130 monitors activity states for these functional units and adjusts the rate at which instructions are processed through pipeline 120, accordingly. For example, one functional unit may include a floating-point register (in register unit 230), and FPU 258 may have components in two or more functional units. In general, a functional unit includes various execution resources (register files, execution units, tracking logic) that are activated and deactivated together. The present invention does not depend on the detailed mapping between the functional units and the execution resources shown in FIG. 2.

Figure 3:
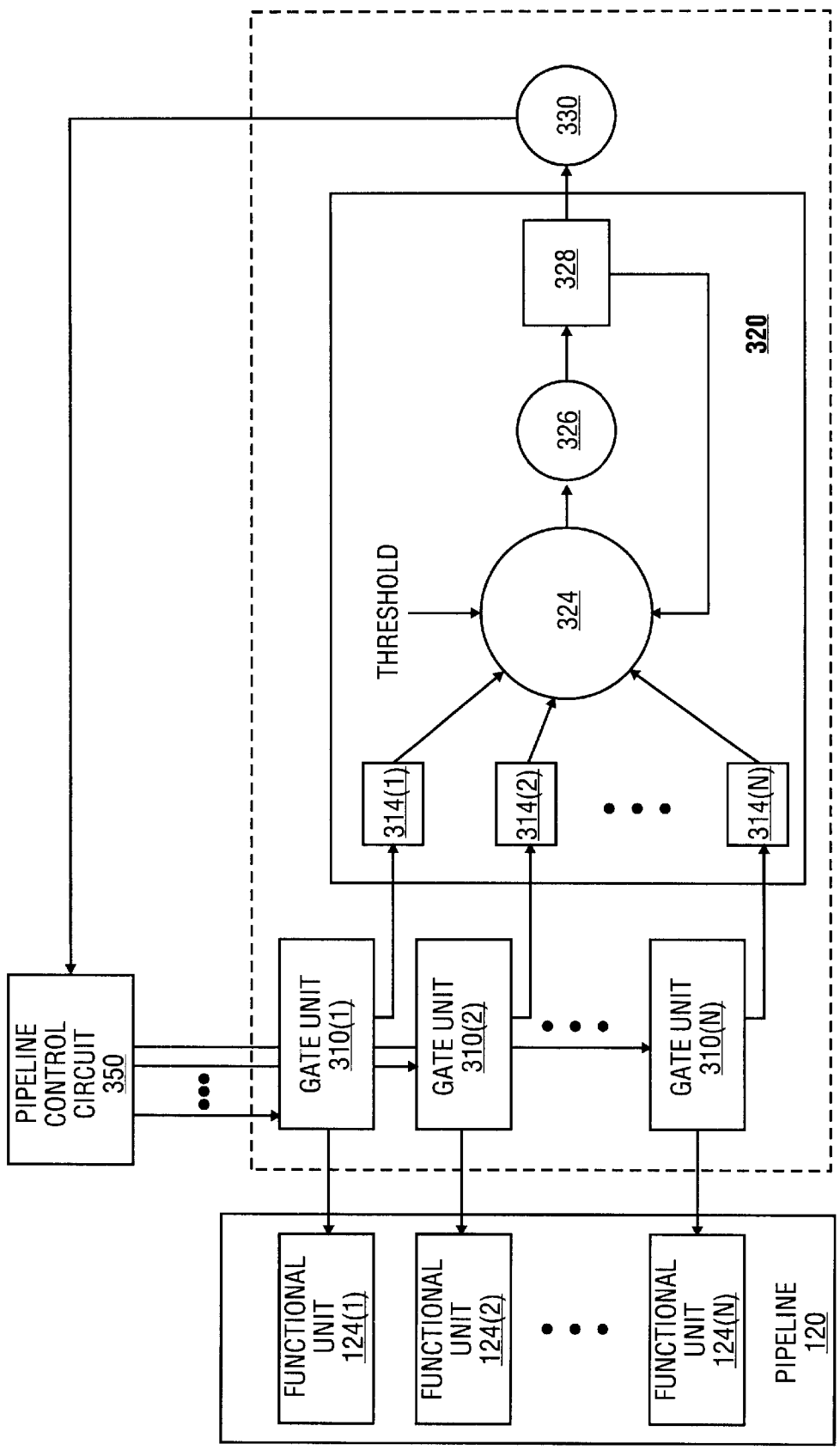
FIG. 3 is a block diagram of one embodiment of the digital power throttle implemented by the processor of FIG. 2.

FIG. 3 is a block diagram representing one embodiment of digital throttle 130 and its interactions with functional units 124 of pipeline 120. The disclosed embodiment of digital throttle 130 includes gate units 310(1)–310($n$) (generically, gate unit 130), a monitor circuit 320, and a throttle circuit 330. Each gate unit 310 is associated with a functional unit 124 in pipeline 120 to control power delivery to the functional unit. For example, gate unit 310 may be a clock gating circuit that couples or decouples a clock signal to functional unit 124 according to whether or not the services of functional unit 124 are necessary to implement an instruction currently in the pipe stage in which the functional unit operates. Also shown in FIG. 3 is a pipeline control circuit 350 which indicates to gate units 310 which functional units are active for the currently executing instructions.

For the disclosed embodiment of digital throttle 130, each gate unit 130 provides a signal to monitor circuit 320 to indicate whether power is being delivered to functional unit 124. For example, the signal may be an activity state of functional unit 124, which is asserted when functional unit 124 is turned "on". When the signal is asserted, i.e. when gate unit 130 provides power to functional unit 124, a power weight for the functional unit is added to the estimated power consumption for processor 110. When the signal is not asserted, i.e. when gate unit 130 cuts off power to function unit 124, the associated power weight is not added to the estimated power consumption power eight. A typical processor may include 10–20 gate units 310 to control power delivery to 10–20 functional units 124.

Monitor circuit 320 collects signals from gate units 130 and determines a current estimated power consumption level for processor 110 from the collected signals. For the disclosed embodiment of digital throttle 130, monitor circuit 320 includes weight units 314(1)–314($n$) (generically, weight units 314), an adder 324, a saturation circuit 326, and an accumulator 328. For one embodiment of the invention, each weight unit 314 is associated with one of functional units 124 through a corresponding gate unit 310. Weight unit 314 provides a power level to adder 324 when the activity state signal from its gate unit 310 is asserted. When the activity state signal is not asserted, weight unit 314 outputs a zero.

Adder 324 sums the power weights indicated by weight units 134 and subtracts the threshold level from the sum. The output of adder 324 is forwarded through saturation circuit 326 to accumulator 328. Saturation circuit 326 is included to prevent wraparound in case the value forwarded by adder 324 overflows. Accumulator 328 provides the forwarded value to throttle circuit 330 and also provides a copy back to adder 324 to be updated according to subsequent activity states of the processor.

At selected intervals, the content of accumulator 328 ("accumulated power") is provided to throttle circuit 330. One embodiment of throttle circuit 330 decreases the flow of instructions through pipeline 120 if the accumulated power is positive, e.g. the accumulated power consumption estimate over the specified interval exceeds the threshold power level. Throttle circuit 330 signals fetch unit 210 to inject "bubbles" into the instruction stream provided to the back end of pipeline 120. In effect, throttle circuit 330 adjusts the duty cycle of the processor clock when the estimated power consumption level for the specified interval exceeds the threshold level.

Table 1 illustrates a set of duty cycle adjustments for the case in which the specified interval is 128 clock cycles.

| Accumulated Power | Duty Cycle |
| --- | --- |
| X < 0 | 128/128 |
| 0 <= X < 1 | 127/128 |
| 1 <= X < 2 | 126/128 |
| 2 <= X < 3 | 125/128 |
| 3 <= X < 4 | 124/128 |
| . . . | . . . |
| 125 <= X < 126 | 2/128 |
| 126 <= X < 127 | 1/128 |
| 127 <= X | 0/128 |

For the embodiment illustrated by Table 1, the power weights may be 8–16 bit, fixed-point numbers proportional to the power consumed by the functional unit when it is activated. The upper 8 bits of X may be used to adjust the duty cycle of the processor clock. These bits change more slowly, damping the instruction flow changes indicated by throttle circuit 330. For the above example, in which the sampling interval is 128 clock cycles, digital throttle 130 provides 128 levels of throttling. These levels provide fine-tuned throttle control that is proportional to the amount by which the estimated power consumption exceeds the threshold power consumption. Preferably, throttle circuit 350 distributes the on/off periods indicated by the estimated power consumption over the sampling interval. The distribution may be uniform, it may be random, or it may be governed by some other pattern. One such distribution is discussed below in greater detail.

Figure 4:
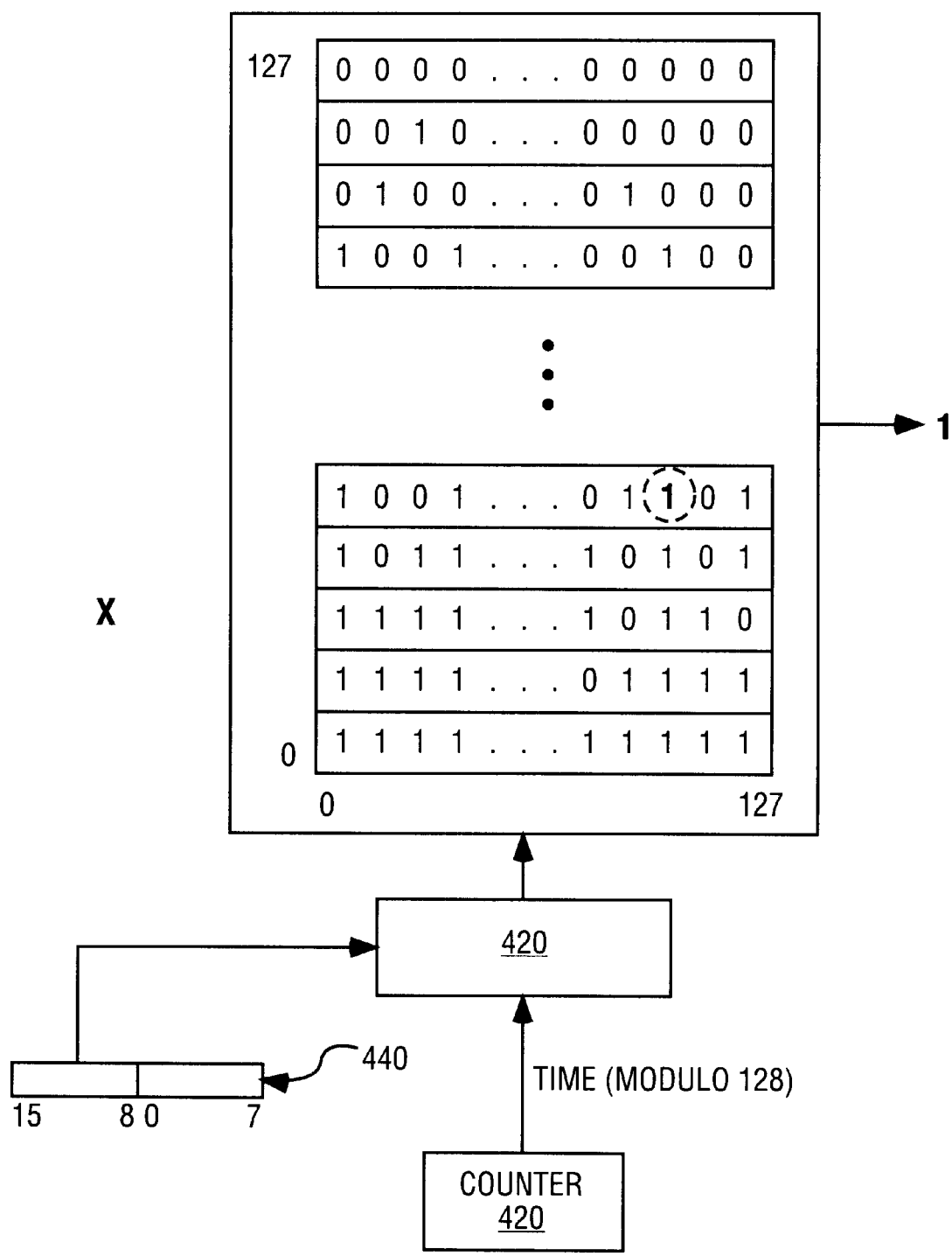
FIG. 4 is a schematic diagram representing one embodiment of the throttle circuit of FIG. 3.

FIG. 4 is a schematic representation of one embodiment of throttle circuit 330. The disclosed embodiment of throttle circuit 330 includes a memory device 410, a control unit 420, and a counter 430. A register 440 of accumulator 338 in which the accumulated power is stored is also shown. Memory device 410 may be, for example, a read only memory (ROM), the entries of which are accessed through control unit 420 in response to a timing indication from counter 420 and an accumulated power level from accumulator 328.

For the disclosed embodiment of throttle circuit 330, counter 430 is a modulo-128 counter. The output of counter 430 increments a column index in control unit 420 from 0–127 on successive clock cycles and back to 0 when 127 is reached. Similarly, the output of accumulator 328 adjusts a row index in control unit 420 according to the current value of the accumulated power. For the disclosed embodiment, the row index is 0, 71, and 123 when X<=0, 72, and 124, respectively. Control unit 420 uses these indices to read out a corresponding entry from memory device 410. The value of the entry indicates whether or not a bubble should be injected into the instruction execution pipeline of processor 110. For example, when the output is 0, a bubble is injected and when the output is 1, no bubble is injected.

For one embodiment of memory device 410, each row is populated by different numbers of 1s and 0s, with the number of 0s scaling with the value of X mapped to the row. For example, row_0 may contain all is, so that no bubbles are injected into the instruction execution pipeline when the accumulated power level (X) does not exceed zero, i.e. when the running power estimate does not exceed the threshold level. At the other end of the power spectrum row_127 may contain no is so that bubbles are injected into the instruction execution pipeline on each clock cycle for as long as the accumulated power level exceeds a specified amount. For the disclosed example, this amount is determined by saturation circuit 328 as 127, i.e. X=>127. Rows between row_0 and row_127 may be populated with 0s in proportion to the value of X. For example, row 67 includes 68 0s distributed in its different columns, row_111 includes 112 0s distributed across its columns, and row 17 includes 18 0s distributed across its columns. For one embodiment of the invention, the 0s may be distributed across the columns of their designated rows in a random fashion.

The disclosed embodiment of digital throttle 130 includes a feedback loop. The amount of throttling depends on the activity states of the functional units, which are in turn influenced by the amount of throttling. Accumulator 328 performs an integration over time, which introduces a 90 degree lagging phase shift into this feedback loop. For stability purposes, it is important to minimize other delays, i.e. phase shifts, within the feedback loop. The stability criteria for the digital feedback loop will likely depend on how significantly the processor's power consumption is adjusted during an interval corresponding to the number of clock cycles needed to traverse the instruction execution pipeline (pipeline interval). For example, the power weights should be chosen to ensure relatively small changes in the power consumption during a pipeline interval.

The response time of digital throttle 130 is controlled by its feedback loop. Because the digital throttle operates in response to discrete signals in the logic rather than macroscopic phenomenon (temperature, current) that are determined by the collective behavior of the processor's components, its response time is one the order of microseconds. Response times for thermal based throttle mechanisms are on the order of seconds. Digital throttle 130 can not control peaks in power consumption that are of shorter duration than this response time. To minimize the performance loss represented by, e.g. injected bubbles, digital throttle 130 responds as slowly as permitted by the power delivery system. This means that the power deliver system should be able to handle peaks in the processor's power consumption that are above the threshold level for intervals shorter than the response time. For these peaks, energy may be provided from the processor's power supply capacitors.

Digital throttle 130 will be more effective the greater the degree of control it has over the processor's power consumption. Digital throttle 130 is most effective where processor 130 implements a gating mechanism that covers a large fraction of the processor's functional units. Extensive gating control means digital throttle 130 can adjust the level of power consumption quickly and significantly when the threshold level is exceeded. Similarly, providing more fine grained control over the functional units increases the effectiveness of digital throttle 130. For example, dividing the processor's execution resources into a larger number of functional units 124 and providing additional gating units to control these functional units provides throttle 130 with greater control over the processor's power consumption.

Figure 5:
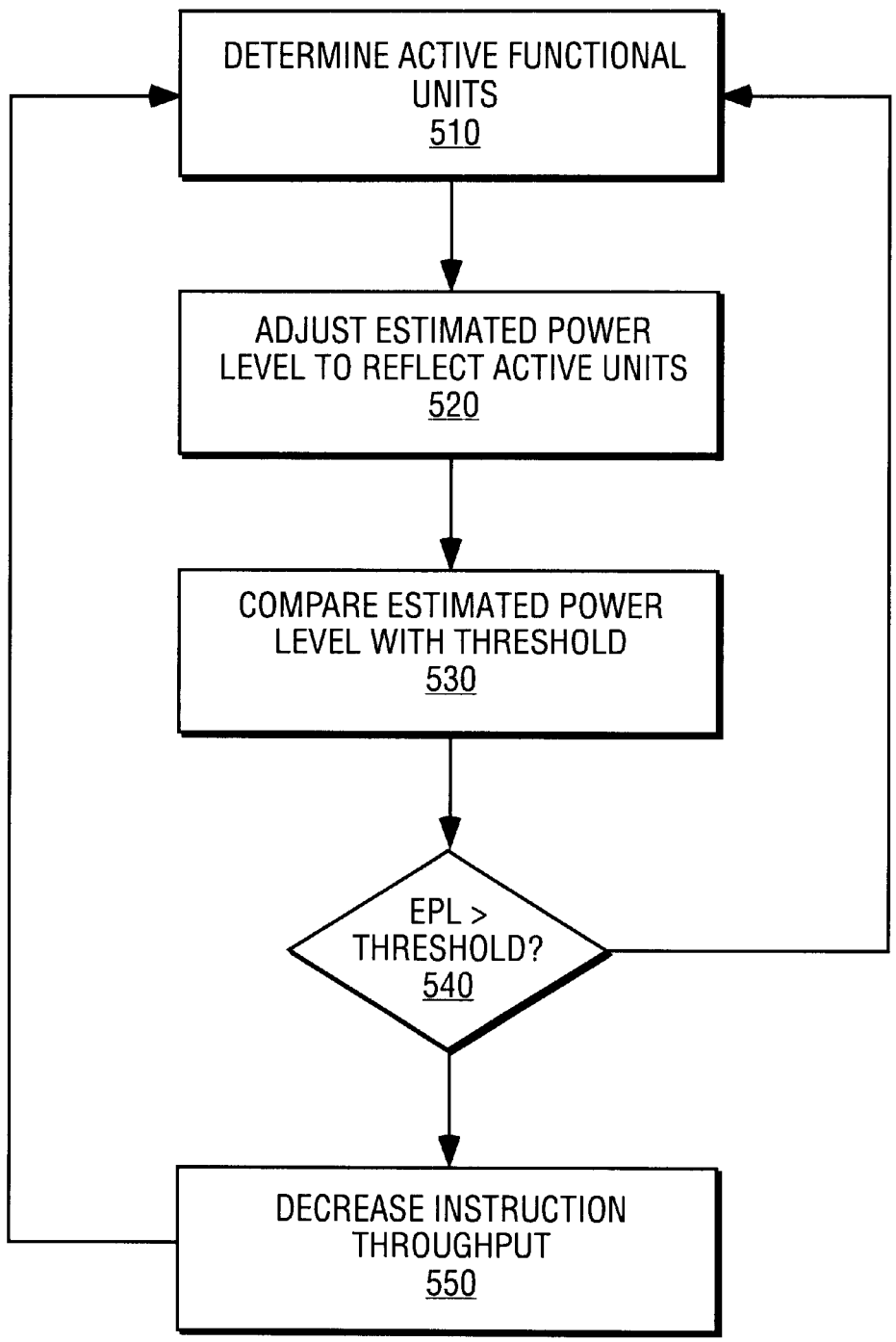
FIG. 5 is a flowchart representing a method in accordance with the present invention for adjusting the power consumption of a processor.

FIG. 5 is a flowchart representing a method 500 in accordance with the present invention for throttling power in a processor. Method 500 first determines 510 which functional units in the processor are active. The state (active/inactive) of a functional unit may be indicated, for example, by a signal from a clock gating circuit that provides power to the function unit. For example, the gating circuit may assert the signal if it is providing power to the function unit (active state), and it may deassert the signal if it is not currently providing power to the functional unit (inactive state).

Once the active functional units have been determined 510, a power level is estimated 520 for the processor. This may be accomplished by associating a power weight with the signal provided by each gating unit and incrementing the estimated power level by the power weight associated with each signal that is asserted. The weighted powers associated with deasserted signals do not contribute to the current estimated power level.

The current estimated power level is compared 530 with a threshold power level. The threshold power level represents, for example, a power level above which the processor should not be operated for an extended period of time. For one embodiment, the threshold is subtracted from the current estimated power level and the result is added to a running estimate of the relative power level of the processor, i.e. the accumulated power. If the accumulated power is positive (EPL>threshold), the instruction throughput is adjusted 540. If the accumulated power is negative (EPL<threshold), no adjustment is made to the instruction throughput.

The instruction throughput of processor may be reduced through a number of mechanisms. For one embodiment of method 500, bubbles may be injected into the instruction execution pipeline to reduce the fraction of clock cycles for which the processor's functional units are active. Bubbles may be introduced by, for example, triggering the issue unit to issue instructions on only selected cycles of the processor clock. For another embodiment of the invention, the frequency at which the processor's clock is operated may be reduced.

One advantage of the present invention is that the execution resources of the processor pipeline are adjusted according to the level of activity in the pipeline's functional units. Unlike thermal or current based techniques for estimating power consumption, the functional unit activity monitored by the digital throttle is a characteristic of individual pipelines within the processor. The consequent specificity in assigning activity and power consumption to specific units is particularly useful in processors that implement multiple execution cores on a single processor chip. Here, "execution core" refers to the execution resources associated with a complete processor, so that multi-execution core processors effectively implement multiple processors on a single chip. The digital throttle of the present invention allows an execution core that is processing a power-hungry code segment to effectively borrow power from the other execution core(s), as long as the total power consumption does not exceed a threshold level. Alternatively, it allows each execution core to be throttled according to the activity in its instruction execution pipeline.

Figure 6A:
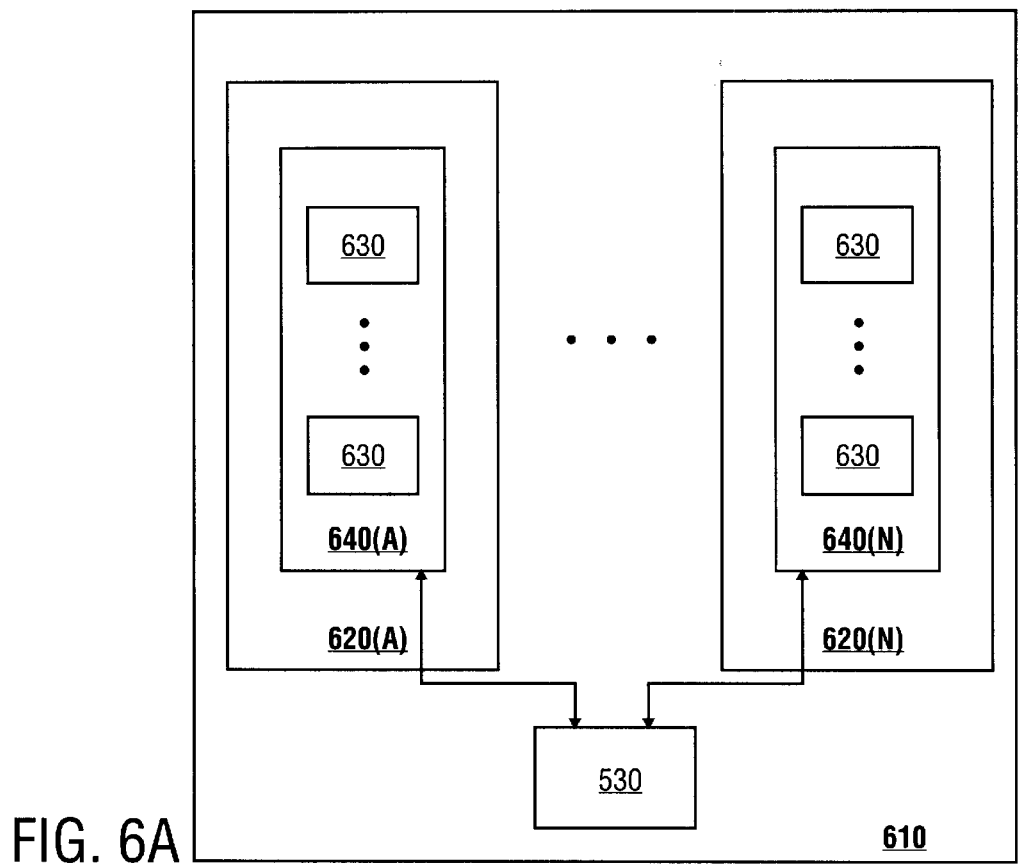
FIGS. 6A and 6B are block diagrams representing embodiments of multiple execution core processors that implement digital throttles in accordance with the present invention.

FIG. 6A is a block level diagram of one embodiment of a multiple execution core processor 610 in which the present invention is implemented. Processor 610 includes execution cores 620(a)–620(n) (generically, execution core(s) 630). Each execution core 620 includes functional units 630 that form an execution pipeline 640. A shared digital throttle 650 monitors and adjusts activity in functional units 630 of all pipelines 640. This embodiment of processor 110 allows each execution core 620 to borrow power from the remaining execution cores as long as the total power threshold is not exceeded.

Figure 6B:
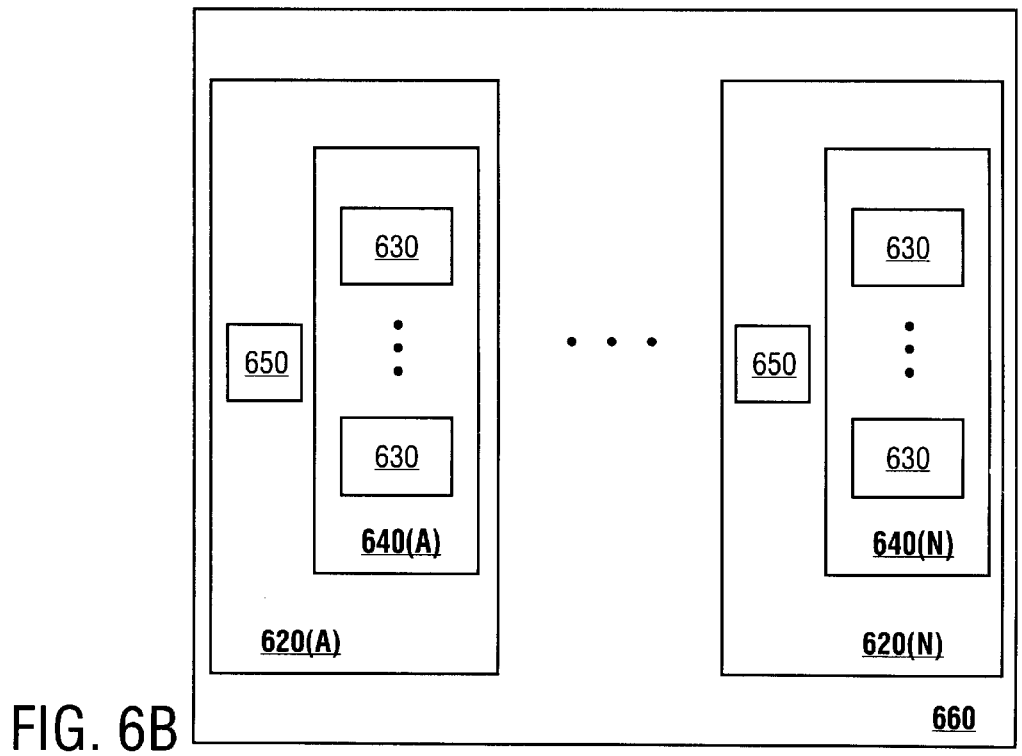

FIG. 6B is a block level diagram of another embodiment of a multiple execution core processor 660 in which the present invention is implemented. Processor 660 includes execution cores 620(a)–620(n) (generically, execution core (s) 630), each of which includes functional units 630 that form an execution pipeline 640. Each execution core 630 also includes a digital throttle 650 to monitor and adjust activity in its functional units 630. This embodiment of processor 110 allows each execution core 620 to be throttled independently by its associated digital throttle 630.

There has thus been provided a digital throttle that controls power consumption in a processor according to activity states of the processor's functional units Activity states are monitored during instruction execution and the execution rate is adjusted according to a power consumption level estimated from the activity states. Power consumption may be controlled by injecting "bubbles" or NOPs into the instruction execution stream in response to the estimated power consumption.

For one embodiment of the invention, a power weight is assigned to each functional unit, and the power consumption of the processor is estimated by summing the power weights for each functional unit that is active. When the estimated power consumption exceeds a threshold value, the digital throttle reduces the rate at which the processor executes instructions. Power weights for the various functional units may be determined by a calibration procedure during processor design or test stages. The digital throttle may also include circuitry to implement a self calibration procedure.

The disclosed embodiments have been provided to illustrate various features of the present invention. Persons skilled in the art of processor design, having the benefit of this disclosure, will recognize variations and modifications of the disclosed embodiments, which none the less fall within the spirit and scope of the appended claims.

We claim:

1. A processor comprising:
   a functional unit;
   a gating circuit to control power delivery to the functional unit and to provide a signal that indicates a power level delivered to the functional unit;
   a monitor circuit to compare the indicated power level with a threshhold power level; and
   a throttle circuit to adjust instruction flow in the processor if the indicated power level exceeds the threshold power level.

2. The processor of claim 1, wherein the functional unit comprises a plurality of functional units that form an instruction execution pipeline for the processor.

3. The processor of claim 2, wherein the gating circuit comprises a plurality of gating circuits, each gating circuit to control power delivery to a corresponding one of the plural functional units.

4. The processor of claim 3, wherein the throttle circuit injects a no-operation (NOP) into the processor pipeline to adjust instruction flow in the processor.

5. The processor of claim 4, wherein monitor circuit receives a signal from each of the plural gating control circuits to determine a power level for the instruction execution pipeline and compares the determined power level with the threshold power level.

6. The processor of claim 1, wherein the power level indicated by the signal represents a power consumption level of the functional unit when it is operational.

7. The processor of claim 1, wherein the throttle circuit reduces a duty cycle of a clock provided by the gating circuit to adjust the instruction flow through the processor.

8. A method for controlling power consumption in a processor comprising:
   collecting power signals from gating circuits in the processor, the power signals indicating power levels currently delivered to functional units associated with the gating circuits;
   adjusting an estimated power consumption according to the collected power signals;
   comparing the estimated power consumption level with a threshold power consumption level; and
   adjusting an instruction execution rate by the processor when the accumulated estimated power consumption level exceeds the threshold power consumption level.

9. The method of claim 8, further comprising accumulating the estimated power consumption levels for a selected period before adjusting the instruction execution rate.

10. The method of claim 9, wherein accumulating the estimated power consumption levels comprises accumulating the estimated power consumption levels for a selected number of cycles of a processor clock.

11. The method of claim 10, wherein adjusting the instruction execution rate comprises reducing a duty cycle of the processor clock over an interval corresponding to the selected number of cycles of the processor clock.

12. The method of claim 8, wherein each gating circuit controls a clock signal provided to its associated function unit.

13. The method of claim 12, wherein adjusting the instruction execution rate comprises adjusting a duty cycle that characterizes the clock signal provided by the gating circuits.

14. The method of claim 13, wherein adjusting the duty cycle comprises reducing the duty cycle uniformly over a selected number of cycles of the clock signal.

15. A computer system comprising:
   a memory system to store instructions for execution;
   an instruction execution pipeline including a plurality of functional units to execute the instructions;
   an instruction delivery system to provide the instructions from the memory system to the instruction execution pipeline at a specified rate;

a plurality of control circuits, each control circuit to control power delivered to one of the plurality of functional units and to provide a signal indicating it is delivering power; and a throttle circuit to estimate a power consumption level from the signals provided by the control circuits and to adjust the specified rate of the instruction delivery system according to the estimated power consumption level.

16. The computer system of claim 15, wherein the signal provided by each of the plural control circuits is calibrated to indicate level of power consumption for the functional unit associated with the control circuit.

17. The computer system of claim 16, wherein instruction delivery circuitry includes an issue unit that issues instructions for processing by instruction execution pipeline at a rate governed by a processor clock.

18. The system of claim 17, wherein throttle circuit adjust the rate of instruction delivery by adjusting a duty cycle that characterizes the processor clock.

19. A processor comprising:

one or more functional units;

one or more gate units, each gate unit to control power delivery to an associated one of the functional units and to indicate an activity state for the associated functional unit; and a monitor circuit to estimate the processor's power consumption level from the indicated activity states of the one or more functional units.

20. The processor of claim 19, wherein the monitor circuit compares the estimated power consumption level to a threshold value and provides an indication of the comparison.

21. The processor of claim 20, further comprising a throttle circuit to adjust a rate of instruction processing in the processor responsive to the indicated comparison.

22. The processor of claim 19, wherein the functional units form an instruction execution pipeline and the processor further includes a pipeline control module to indicate the activity states for the one or more functional units according to types of instructions in the instruction execution pipeline.

23. The processor of claim 22, wherein the digital throttle includes a gate unit associated with each of the one or more functional units and each gate unit controls power to its associated functional unit in response to the activity state indicated for the functional unit.

24. The processor of claim 22, wherein the digital throttle further comprises a monitor circuit to estimate the processor's power consumption level using the activity states of the one or more functional units.

25. The processor of claim 24, wherein the monitor circuit associates a weighted power weight with each functional unit and increments the estimated power consumption level by the weighted power weight if the activity state for the functional unit is in a first state.

* * * * *

UNITED STATES PATENT AND TRADEMARK OFFICE
CERTIFICATE OF CORRECTION

PATENT NO.     : 6,564,328 B1
DATED          : May 13, 2003
INVENTOR(S)    : Grochowski et al.

It is certified that error appears in the above-identified patent and that said Letters Patent is hereby corrected as shown below:

<u>Title page,</u>
Item [75], Inventors, delete "Matthews", insert -- Mathews --.

<u>Column 7,</u>
Line 26, after "contain all", delete "is", insert -- ls --.
Line 31, after "contain no", delete "is", insert -- ls --.

Signed and Sealed this

Eighteenth Day of November, 2003

JAMES E. ROGAN
*Director of the United States Patent and Trademark Office*